United States Patent [19]

Sutherland

[11] 4,070,722
[45] Jan. 31, 1978

[54] HUNTING BLIND BOAT COVER

[76] Inventor: Johnny L. Sutherland, Rte. 2, Calvert City, Ky. 42029

[21] Appl. No.: 710,858

[22] Filed: Aug. 2, 1976

[51] Int. Cl.² .............................................. B63B 35/72
[52] U.S. Cl. ........................................... 9/5; 114/71; 135/6
[58] Field of Search ........................ 9/5, 1.1, 1.5, 1.7, 9/4 R; 114/71; 135/6

[56] References Cited
U.S. PATENT DOCUMENTS 1,832,046  11/1931  Olson .................................... 9/4 R
2,889,839  6/1959  Sheridan, Jr. ............................ 135/6

Primary Examiner—Stephen G. Kunin
Assistant Examiner—Sherman D. Basinger
Attorney, Agent, or Firm—Harrington A. Lackey

[57] ABSTRACT

A hunting blind in the form of a covered superstructure adapted to seat upon the gunwales of a boat hull and having a top wall including an elongated central head opening covered by an elongated, elevated roof structure having a hatch opening and a hatch adapted to open and close the hatch opening. The elevated roof structure has a pair of elongated opposed side walls including a plurality of observation ports.

7 Claims, 6 Drawing Figures

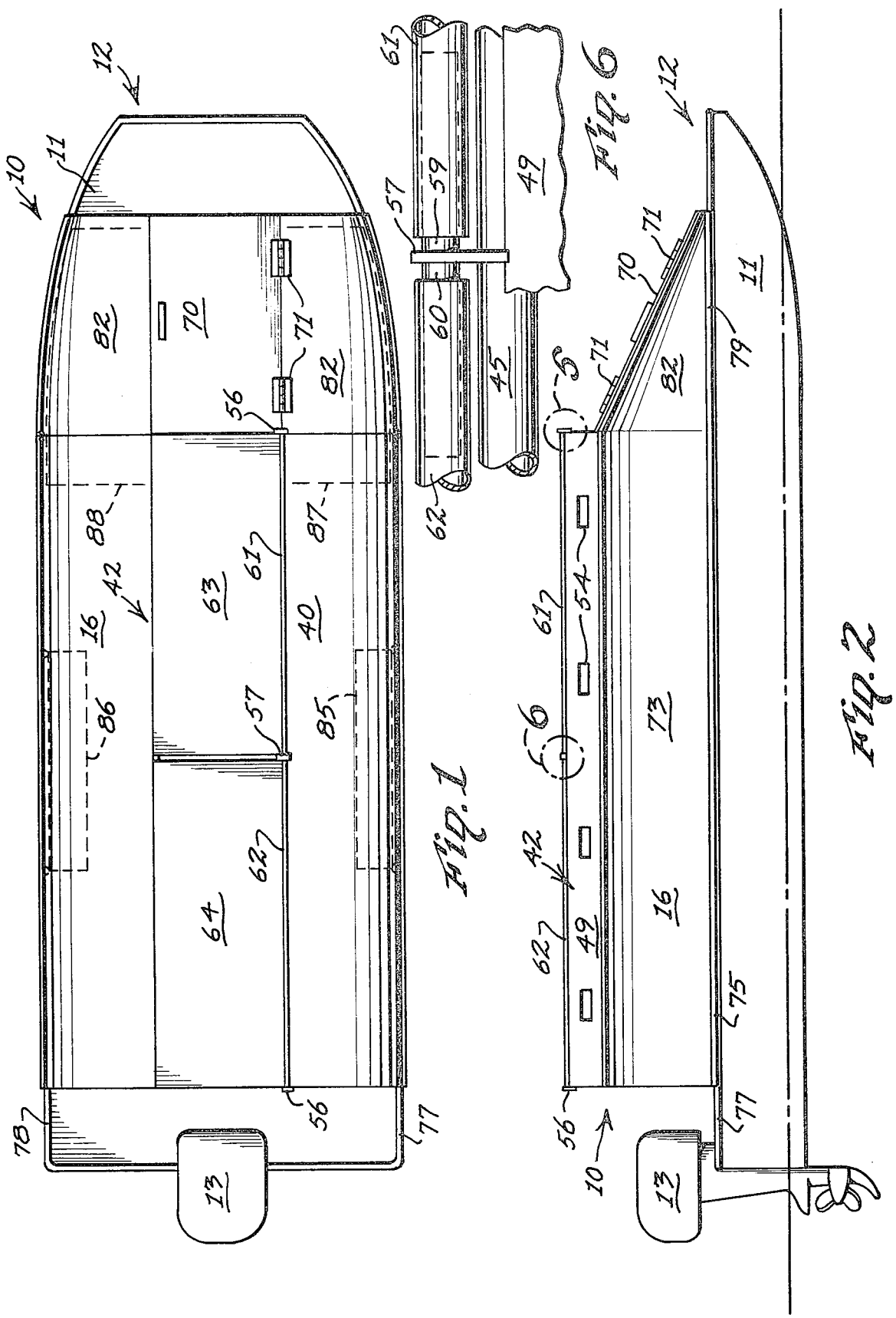

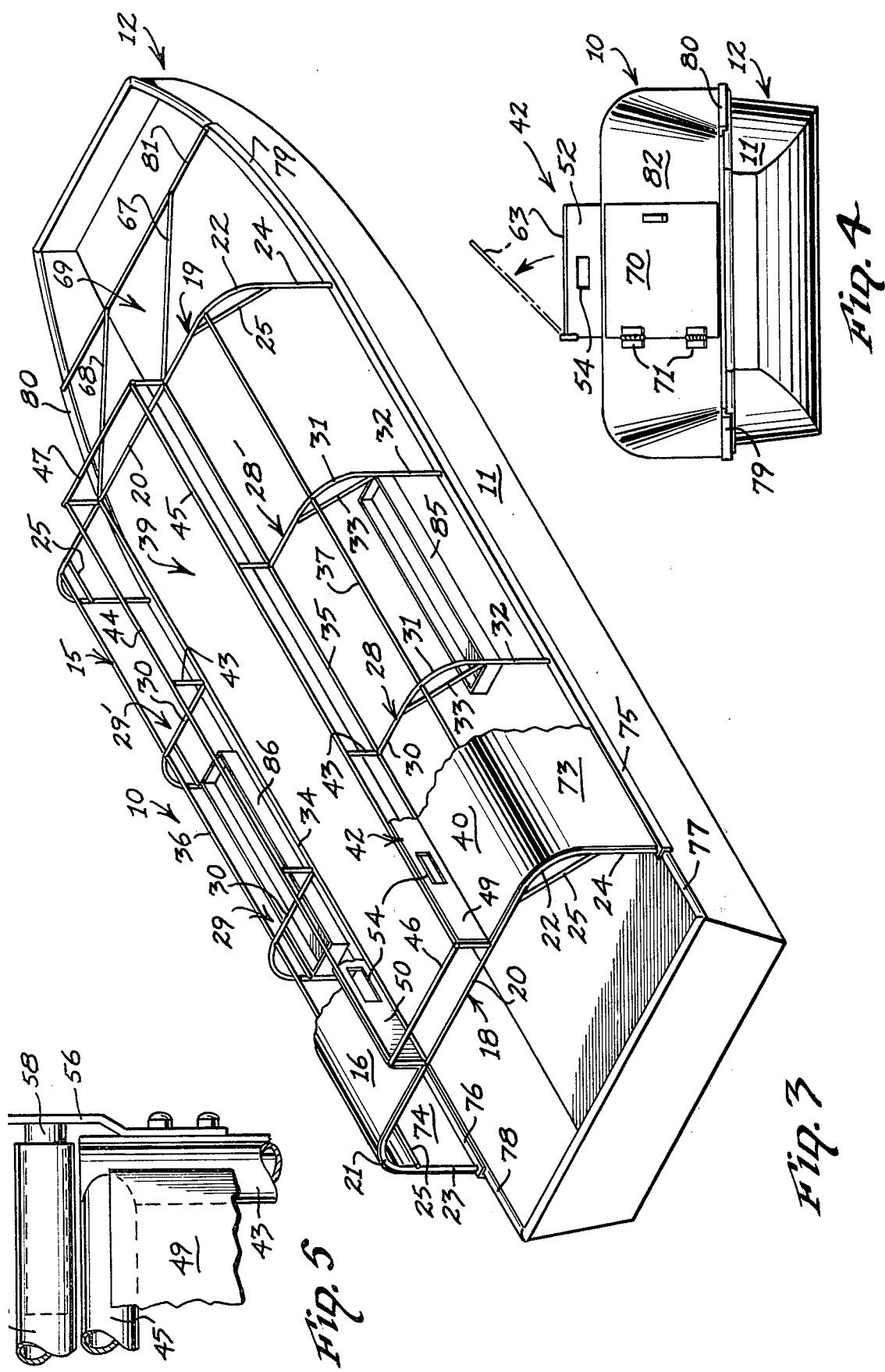

HUNTING BLIND BOAT COVER

BACKGROUND OF THE INVENTION

This invention relates to hunting blinds, and more particularly to a hunting blind in the form of a boat cover.

Hunting blinds and duck blinds of either the stationary or floating type are well-known in the art. However, most floatng blinds are formed as an integral part of a boat hull or floatation member. It is not believed that a hunting or duck blind exists in the form of a covered superstructure adapted to be detachably seated upon the gunwales of an existing or conventional open-type boat hull.

SUMMARY OF THE INVENTION

It is therefore an object of this invention to provide a hunting or duck blind in the form of a covered superstructure having one or more hatches therein, having sufficient integral strength to span the width of an open-top conventional boat, and adapted to be detachably supported or mounted upon the gunwales of the boat hull.

More specifically, this hunting blind is an elongated covered superstructure having top, side and front walls. The bottom edges of the side walls are provided with foot supports for detachably seating upon the gunwales of an open-top boat hull and for providing a canopy elevated above the hull to receive and conceal hunters and their equipment.

A hunting blind, made in accordance with this invention, further includes at least one hatch adapted to open and close a hatch opening in the top wall of the superstructure, and also preferably includes a front hatch for opening and closing a hatch opening in the front wall of the superstructure. The center portion of the top wall is preferably an elevated roof structure having opposed side walls with observation ports therethrough.

BRIEF DESCRIPTION OF THE DRAWINGS

FIG. 1 is a top plan view of the hunting blind, made in accordance with this invention, mounted upon an opentop boat;

FIG. 2 is a right-side elevation of the blind and boat disclosed in FIG. 1;

FIG. 3 is a top, rear perspective view of a blind mounted upon the boat, with portions of the covering sheet material removed from the frame of the superstructure;

FIG. 4 is a front elevation of the blind and the boat, disclosed in FIG. 1, with one of the top hatch covers shown in an open phantom position;

FIG. 5 is an enlarged fragmentary side elevation of the front end portion of the hinge construction for the top hatch covers, as illustrated in phantom circle 5 in FIG. 2; and FIG. 6 is an enlarged fragmentary side elevation of the adjacent hinge construction for the front and rear top hatch covers, as illustrated in the phantom circle 6 in FIG. 2.

DESCRIPTION OF THE PREFERRED EMBODIMENTS

Referring now to the drawings in more detail, the hunting blind 10 is disclosed as being detachably mounted upon the hull 11 of an open-top boat 12, which may provide with an outboard motor 13.

Blind 10 is preferably constructed of a framework 15, covered with a skin 16 of aluminum or other appropriate covering material.

The superstructure framework 15 includes a rear frame member 18 and a front frame member 19 of identical construction each having a horizontal top bar 20 connected at their extremities by arch portions 21 and 22 to vertical bars or legs 23 and 24. The arch portions 21 and 22 may be reinforced by brace arms 25.

The superstructure framework 15 may also include a plurality of intermediate opposed frame members 28, 28', 29 and 29'. Each of these intermediate frame members, such as 28, includes a horizontal bar section 30 connected through an arch section 31 to vertical leg 32. Each arch section 31 may be reinforced by a brace arm 33. The inner ends of the horizontal frame bars 30 terminate, and are fixed to, such as by welding, elongated center frame bars 34 and 35, respectively, extending the full length of the framework 15.

Longitudinal side bars 36 and 37 also connect all of the frame members 18, 28, 28', 29, 29', and 19 together, as disclosed in FIG. 3.

The longitudinal center bars 34 and 35 define a head opening 39, through the top wall 40 of the covered superstructure 15-16. Covering this head opening 39 is an elevated roof structure 42, including vertical posts 43 projecting upward from the center bars 34 and 35 and supporting longitudinal elevated bars 44 and 45 and transverse end bars 46 and 47. The vertical posts 43 are covered by the same type of skin material as the skin 16, to provide upper side walls 49 and 50 and front end wall 52. Observation ports 54 are formed through the side walls 49 and 50 and the front wall 52.

Supported upon the right top longitudinal bar 45 are end hinge brackets 56 and an intermediate hinge bracket 57, to which are fixed, respectively, an end hinge pintle 58 (FIG. 5) and intermediate hinge pintles 59 and 60 (FIG. 6). Journaled upon the hinge pintles 58, 59 and 60 are a pair of tubular hinge bars 61 and 62 fixed to the right side edges of corresponding top hatches 63 and 64.

Projecting forward and declining from the front top bar 20 are a pair of front hatch frame bars 67 and 68, in vertical longitudinal alignment with the longitudinal center bars 35 and 34, and forming a front hatch opening 69. The front hatch opening 69 is adapted to be opened and closed by the front hatch 70, secured by hinges 71 to the front wall 82.

Side walls 73 and 74 have their lower edges terminating in corresponding elongated foot support devices in the form of opposed angle flanges 75 and 76. The foot flanges 75 and 76 have the same configuration and the same tranverse spacing as the side gunwales 77 and 78 of the boat hull 11. As illustrated in FIG. 3, the foot flanges 75 and 76 are substantially straight, but curve at their forward portions 79 and 80 to conform to the curving bow of the boat hull 11. The front flange portions 79 and 80 and the declining front hatch frame bars 67 and 68 are covered by a skin to form a forward, declining, streamlined front wall 82.

As disclosed in FIG. 3, the rear frame member 18 and the rear end of the elevated roof structure 42 may remain uncovered to provide rear observation and ventilation openings for the interior of the blind 10.

Elongated storage boxes 85 and 86 (FIGS. 1 and 3) may be mounted upon the vertical posts 32 of the side walls 73 and 74 for storing various items, such as hunting equipment and ammunition.

Larger storage areas or compartments 87 and 88 (FIG. 1) may be provided beneath the front wall 82, on opposite sides of the front hatch 70, for storing larger items such as duck decoys.

The blind 10 may be easily installed upon an existing open-top boat 12 by merely seating the angular foot flanges 75 and 76 upon the corresponding side gunwales 77 and 78. The weight of the blind 10, as well as the curved configuration of the front foot portions 79 and 80 will limit longitudinal movement of the blind 10 upon the boat 12, so that no securing or locking means are necessarily required for holding the blind 10 upon the boat 12.

When the blind 10 is no longer needed, it may be merely lifted from the gunwales 77 and 78, removed from the boat 12 and stored for future use. With the blind 10 removed, the boat 12 may be employed for other uses.

When the blind 10 is mounted upon the boat 12, the hunters may enter the boat 12 through the open rear end of the blind 10, or through the front hatch opening 69. The hunters may sit in the bottom of the boat 12 with their heads extending through the head opening 39 so that they may have a clear but concealed view of the surrounding areas through the observation ports 54. When prey, such as ducks are sighted, and the boat, with its concealed hunters, maneuvers into position, any one or more of the top hatches 63 or 64 or the front hatch 70 may be raised about its corresponding hinges to permit the hunter to rise to a shooting position.

The blind 10 is designed not only for strength and lightness, by using strong lightweight materials in the frame members, but is also constructed to minimize any obstructive framework within the space between the boat hull 11 and the blind 10 occupied by the hunters. The only interior reinforcing members, outside of the planes of the respective walls, are the cross braces 25 and 33, which occupy a minimum of space.

What is claimed is:

1. A hunting blind adapted to be supported upon an elongated boat hull having an open top and a pair of opposed elongated gunwales, comprising:
   a. an elongated, rigid, covered superstructure having main top, front and side walls, the width between said main side walls being substantially equal to the width of a boat hull having opposed elongated gunwales upon which the superstructure is to be mounted,
   b. said main side walls having lower feet means adapted to detachably seat upon the elongated gunwales of said boat hull for supporting said superstructure above said hull,
   c. said main top wall comprising a pair of opposed longitudinal structural members defining the side margins of an elongated head opening through said top wall and extending substantially the length of the center portion of said superstructure and having a width substantially less than the width between the main side walls of said superstructure, but wide enough to permit the passage therethrough of a man's body,
   d. an elongated elevated roof structure covering said head opening,
   e. said roof structure having a pair of opposed upper side walls, each upper side wall projecting upward from each of said longitudinal structural members above said main top wall,
   f. said upper side walls having opposed upper edges defining the sides of an elongated hatch opening spaced vertically above said head opening,
   g. an elongated hatch adapted to cover said hatch opening,
   h. means operatively connecting said hatch cover to one of said upper side walls for opening and closing said hatch opening, and
   i. a plurality of observation ports in both of said upper side walls.

2. The invention according to claim 1 in which said hatch opening extends the entire length of said roof structure, and said hatch comprises at least one hatch for opening and closing said hatch opening.

3. The invention according to claim 1 in which said means for operatively connecting said hatch to one of said upper side walls comprises hinge means.

4. The invention according to claim 3 in which said main front wall declines forward, a front hatch opening in said main front wall, a front hatch, and means mounting said front hatch to open and close said main front hatch opening.

5. The invention according to claim 4 in which said elongated front hatch opening declines forward the length of said main front wall, a front hatch substantially the same dimension as said front hatch opening, and means mounting said front hatch to open and close said front hatch opening.

6. The invention according to claim 5 in which said front hatch opening and said front hatch decline forward from, and are substantially the same width as, said elevated roof structure.

7. The invention according to claim 1 in which said main side walls are substantially vertical and said main top wall is substantially horizontal, said main top wall being connected to said main side walls by arcuate corner portions.

\* \* \* \* \*